United States Patent
Danielsson et al.

(10) Patent No.: US 10,222,488 B2
(45) Date of Patent: Mar. 5, 2019

(54) MODULAR X-RAY DETECTOR

(71) Applicant: Prismatic Sensors AB, Stockholm (SE)

(72) Inventors: Mats Danielsson, Taby (SE); Staffan Karlsson, Bromma (SE)

(73) Assignee: PRISMATIC SENSORS AB, Stockholm (SE)

( * ) Notice: Subject to any disclaimer, the term of this patent is extended or adjusted under 35 U.S.C. 154(b) by 0 days.

(21) Appl. No.: 15/505,355

(22) PCT Filed: Sep. 5, 2016

(86) PCT No.: PCT/SE2016/050829
§ 371 (c)(1),
(2) Date: Feb. 21, 2017

(87) PCT Pub. No.: WO2017/052443
PCT Pub. Date: Mar. 30, 2017

(65) Prior Publication Data
US 2017/0269238 A1    Sep. 21, 2017

Related U.S. Application Data

(60) Provisional application No. 62/232,030, filed on Sep. 24, 2015.

(51) Int. Cl.
*G01T 1/24* (2006.01)
*G21K 1/02* (2006.01)

(52) U.S. Cl.
CPC .............. *G01T 1/243* (2013.01); *G01T 1/244* (2013.01); *G01T 1/247* (2013.01); *G21K 1/02* (2013.01); *G21K 1/025* (2013.01)

(58) Field of Classification Search
CPC ............ G21K 1/02; G21K 1/025; G21K 1/10; G21K 1/062; G01T 1/2018; G01T 1/247;
(Continued)

(56) References Cited

U.S. PATENT DOCUMENTS 5,144,141 A    9/1992  Rougeot et al.
6,207,944 B1 *  3/2001  Spartiotis .......... H01L 27/14601
                                              250/208.1
(Continued)

FOREIGN PATENT DOCUMENTS

WO    2005/096946 A1    10/2005
WO    WO 2013176657 A1 *  11/2013  ........... G01T 1/2018

OTHER PUBLICATIONS

Nagarkar, V. et al., "A Modular High-Resolution Photon-Counting X-Ray Detector," SPIE Newsroom, Dec. 29, 2010, 3 pages.
(Continued)

*Primary Examiner* — Taeho Jo
(74) *Attorney, Agent, or Firm* — Young & Thompson

(57) ABSTRACT

There is provided a detector module (1) for a modular x-ray detector, wherein the detector module (1) includes multiple x-ray detector substrates (10) and associated anti-scatter collimators (20). Each x-ray detector substrate (10) has a number of detector diodes, and each x-ray detector substrate has an associated anti-scatter collimator (20). Each x-ray detector substrate (10) has an integrated circuit (30) for collecting x-ray signals from the diodes attached to the x-ray detector substrate at the bottom of the x-ray detector substrate assuming the top is where the x-rays enter, and the associated anti-scatter collimator (20) is placed above the integrated circuit (30).

18 Claims, 7 Drawing Sheets

(58) Field of Classification Search
CPC ........... G01T 1/2928; G01T 1/16; G01T 1/24;
G01T 1/246; G01T 1/243
USPC .................................................... 250/370.14
See application file for complete search history.

(56) References Cited

U.S. PATENT DOCUMENTS

| | | | |
|---|---|---|---|
| 9,513,384 B2* | 12/2016 | Poorter | G01T 1/2018 |
| 2002/0181647 A1 | 12/2002 | Venkataramani et al. | |
| 2003/0020964 A1* | 1/2003 | Baertsch | G06F 19/321 358/409 |
| 2007/0242804 A1 | 10/2007 | Vogtmeier et al. | |
| 2008/0061395 A1* | 3/2008 | Tkaczyk | A61B 6/032 257/443 |
| 2008/0283760 A1* | 11/2008 | Tsuchiya | G01T 1/2928 250/370.09 |
| 2009/0008564 A1* | 1/2009 | Balan | G01T 1/1644 250/366 |
| 2009/0168968 A1* | 7/2009 | Banchieri | G21K 1/025 378/147 |
| 2010/0204942 A1* | 8/2010 | Danielsson | G01T 1/242 702/85 |
| 2011/0122998 A1* | 5/2011 | Proksa | G01T 1/2928 378/154 |
| 2014/0016742 A1* | 1/2014 | Sall | A61B 6/06 378/37 |
| 2014/0050296 A1* | 2/2014 | Ying | A61B 6/032 378/7 |
| 2014/0321609 A1 | 10/2014 | Levene et al. | |
| 2014/0348290 A1* | 11/2014 | Harrison | G01N 23/046 378/19 |
| 2014/0355734 A1* | 12/2014 | Ying | A61B 6/032 378/7 |
| 2015/0324973 A1* | 11/2015 | Ueki | A61B 6/504 382/132 |
| 2016/0187498 A1* | 6/2016 | Deych | G01T 1/2018 250/362 |
| 2016/0320495 A1* | 11/2016 | Ying | G01T 1/2018 |

OTHER PUBLICATIONS

Xu, C. et al., "Evaluation of Energy Loss and Charge Sharing in Cadmium Telluride Detectors for Photon-Counting Computed Tomography," IEEE Transactions on Nuclear Science, vol. 58, No. 3, Jun. 2011, pp. 614-625.

Fitrio, D. et al., "A CMOS Analog Integrated Circuit for Pixel X-Ray Detector," ISIC, Proceeding of the 2009 12th International Symposium, Dec. 2009, pp. 179-182.

Danielsson, M. et al., "Dose-Efficient System for Digital Mammography," Proc. SPIE, Physics of Medical Imaging, vol. 3977, 2000, pp. 239-249.

International Search Report and Written Opinion issued in Application No. PCT/SE2016/050829, dated Dec. 13, 2016.

* cited by examiner

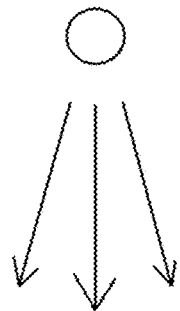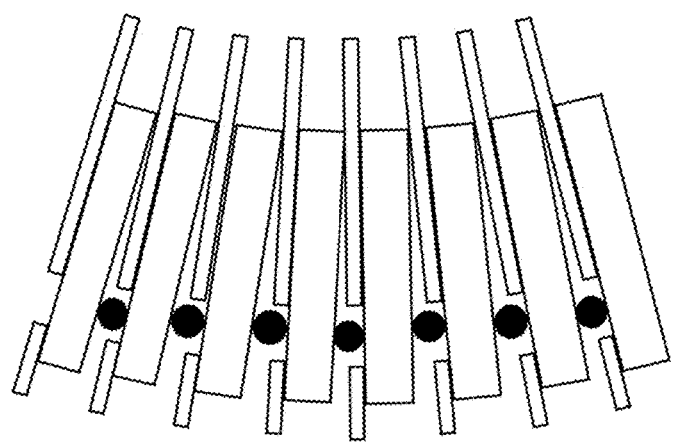
Fig 4

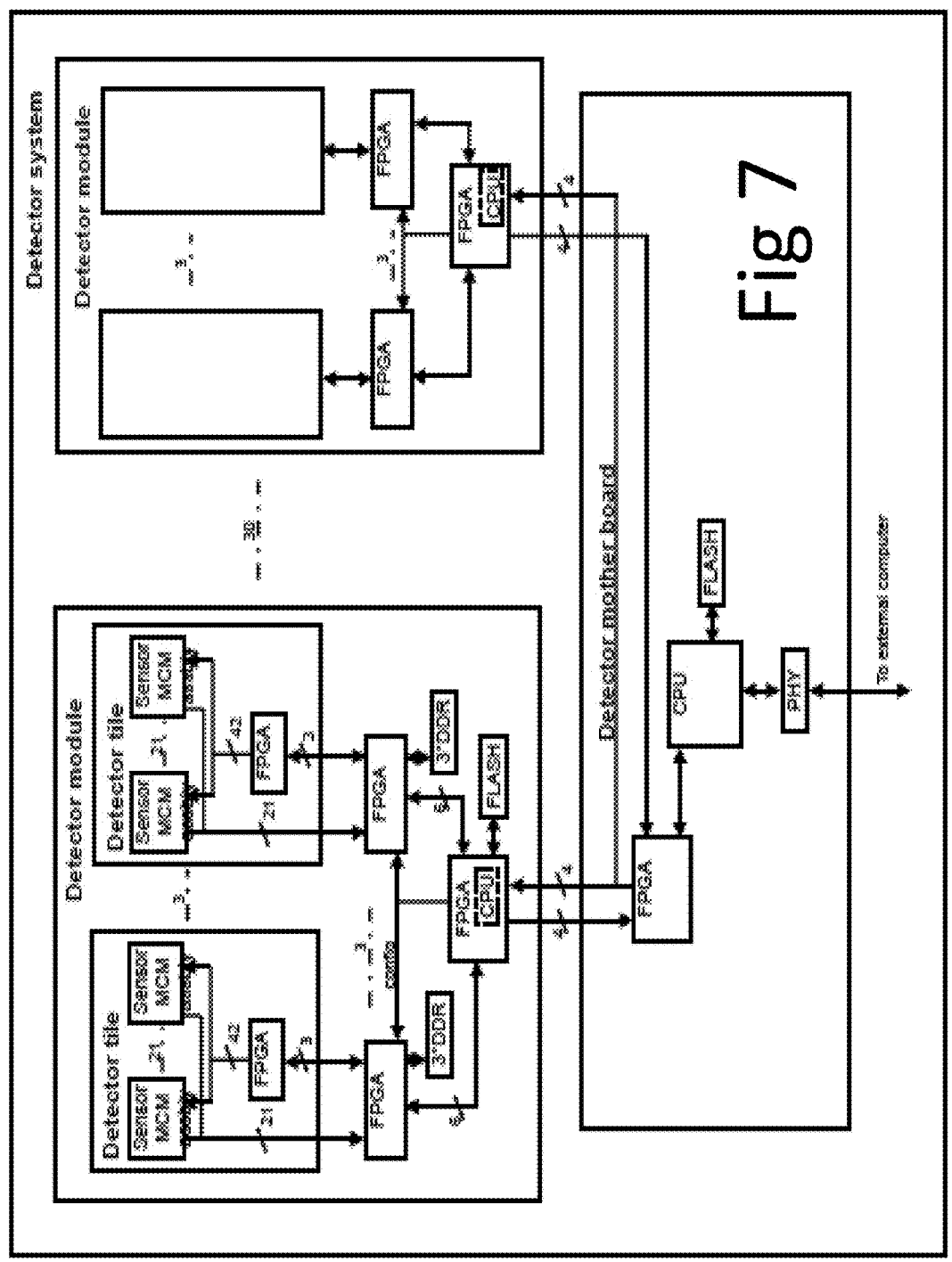

MODULAR X-RAY DETECTOR

TECHNICAL FIELD

The proposed technology generally relates to x-ray detectors and more specifically to a modular x-ray detector and a detector module for such a modular x-ray detector.

BACKGROUND

When constructing x-ray detectors, the main challenges are to achieve high detection efficiency, enable a modular arrangement of detectors and/or make sure packaging and wiring is possible so that the detector can be efficiently produced. It is furthermore beneficial if all requirements can be met at the same time, which is a challenge since in part the requirements contradict each other. For example the wiring and packaging required for a modular arrangement often means you have to sacrifice active detector area such that the geometrical efficiency is reduced.

Furthermore the x-ray detector in most cases has to be integrated with an anti-scatter collimator or grid to eliminate scatter from the object and/or between detector modules. It is also desirable that sensitive integrated circuits are protected from direct radiation since a high accumulated dose could negatively impair the functioning of the circuits.

At the same time each detector module and anti-scatter grid should preferably be accurately aligned to the incident x-rays from the source.

State-of-the art detectors in for example Computed Tomography are based on a scintillator converting the x-rays to visible light that is detected by a dedicated photo diode that integrate the signal for many x-rays. The photo diode is connected to integrated circuits that digitize the produced current and this value is used to calculate grey scale values displayed in the x-ray image. A one-dimensional or two dimensional anti scatter grid is placed on top of the scintillators and diodes. To avoid cross talk a trench separates each scintillator-diode assembly. The anti-scatter collimator is positioned to match the trenches in order to minimize any dead area. There are several ways to solve the packaging and wiring challenges: to connect the diode to the integrated circuit, to provide power and data transmission. There are good examples how these challenges can be addressed. One example is disclosed in reference [1] where a fully modular arrangement is presented that can be tiled in two dimensions. Another example for an interconnect and packaging method is presented in reference [2] where an elastomer conducting contact is configured to provide a high-voltage anode signal.

The last years a lot of research focus both in academia and in industry has been focused on how to provide x-ray detectors with higher spatial and contrast resolution. One of the most promising ways to achieve this is through photon counting spectral detectors. So far these imaging detectors are only available for mammography in early breast cancer detection, see reference [3], but the next use may be in Computed Tomography. Two different solutions have emerged, one based on heavy detector elements such as CdTe or CdZnTe presented for example in reference [4] and another based on Silicon as detector material as outlined in reference [5].

In a Silicon detector assembly such as outlined in reference [5] the challenges in detection efficiency and modularity are very different compared to assemblies with heavy elements as detector material since the Silicon detectors need to be much longer (around 30-40 times) in the direction of the incoming x-rays in order to absorb a major fraction of the x-rays. This means the geometry and mechanical constraints are very different.

SUMMARY

It is an object to provide an improved detector module for a modular x-ray detector.

It is also an object to provide an improved modular x-ray detector based on such detector modules.

These and other objects are met by embodiments of the proposed technology.

In a first aspect of the proposed technology, there is provided a detector module for a modular x-ray detector, wherein the detector module comprises multiple x-ray detector substrates and associated anti-scatter collimators. Each x-ray detector substrate has a number of detector diodes, and each x-ray detector substrate has an associated anti-scatter collimator. Further, each x-ray detector substrate has an integrated circuit for collecting x-ray signals from the diodes attached to the x-ray detector substrate at the bottom of the x-ray detector substrate assuming the top is where the x-rays enter, and the associated anti-scatter collimator is placed above the integrated circuit.

This type of detector module enables an efficient way of building a modular x-ray detector.

In a second aspect of the proposed technology, there is thus provided a modular x-ray detector comprising a number of detector modules of the first aspect.

Other advantages will be appreciated when reading the detailed description.

BRIEF DESCRIPTION OF DRAWINGS

FIG. 4 is a schematic diagram illustrating an example of how to get a tapered geometry where anti-scatter collimators and detector substrate are pointing back to the source to provide an overall curved detector geometry.

FIG. 7 is a schematic diagram illustrating an example of an architecture for electronic readout of data and for distributing control commands to detector modules.

DETAILED DESCRIPTION

Figure 1:
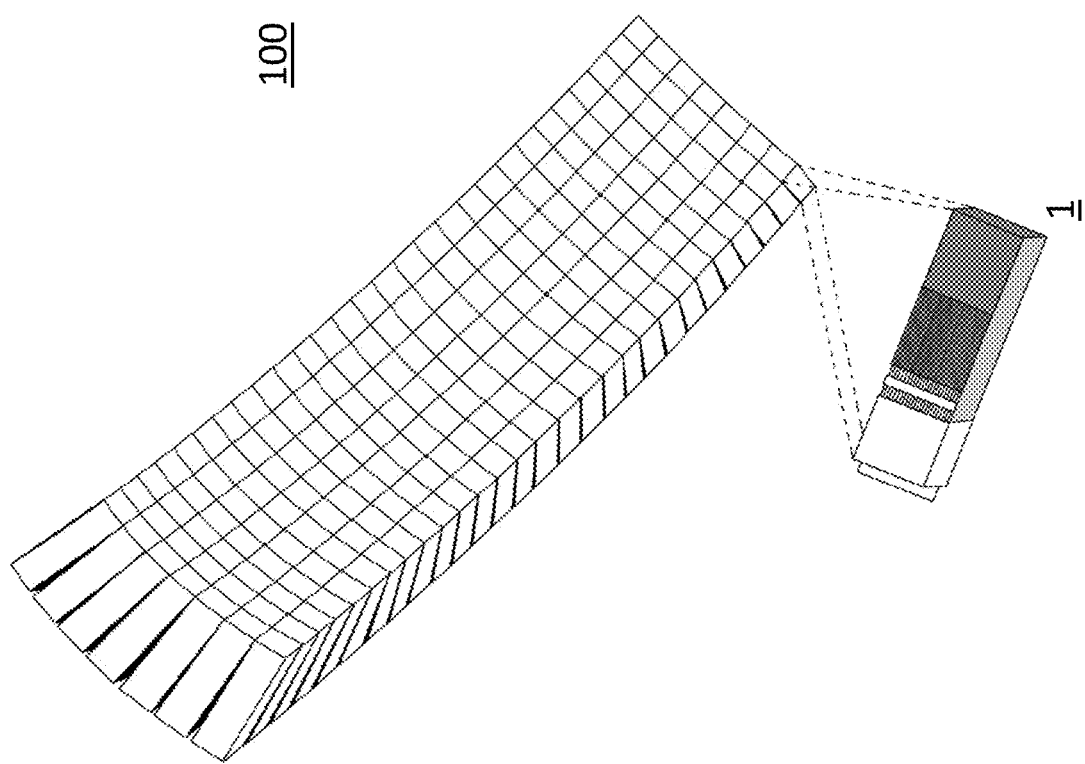
FIG. 1 is a schematic diagram illustrating an example of an x-ray detector module and a corresponding modular detector assembly.

An illustrative, non-limiting example of the present invention is illustrated in FIG. 1 where an x-ray detector module and a corresponding modular detector assembly 100 is displayed where modules can be tiled to achieve any area of the full detector assembly as long as boundary conditions of maximum power and data transfer rates can be handled.

Figure 2:
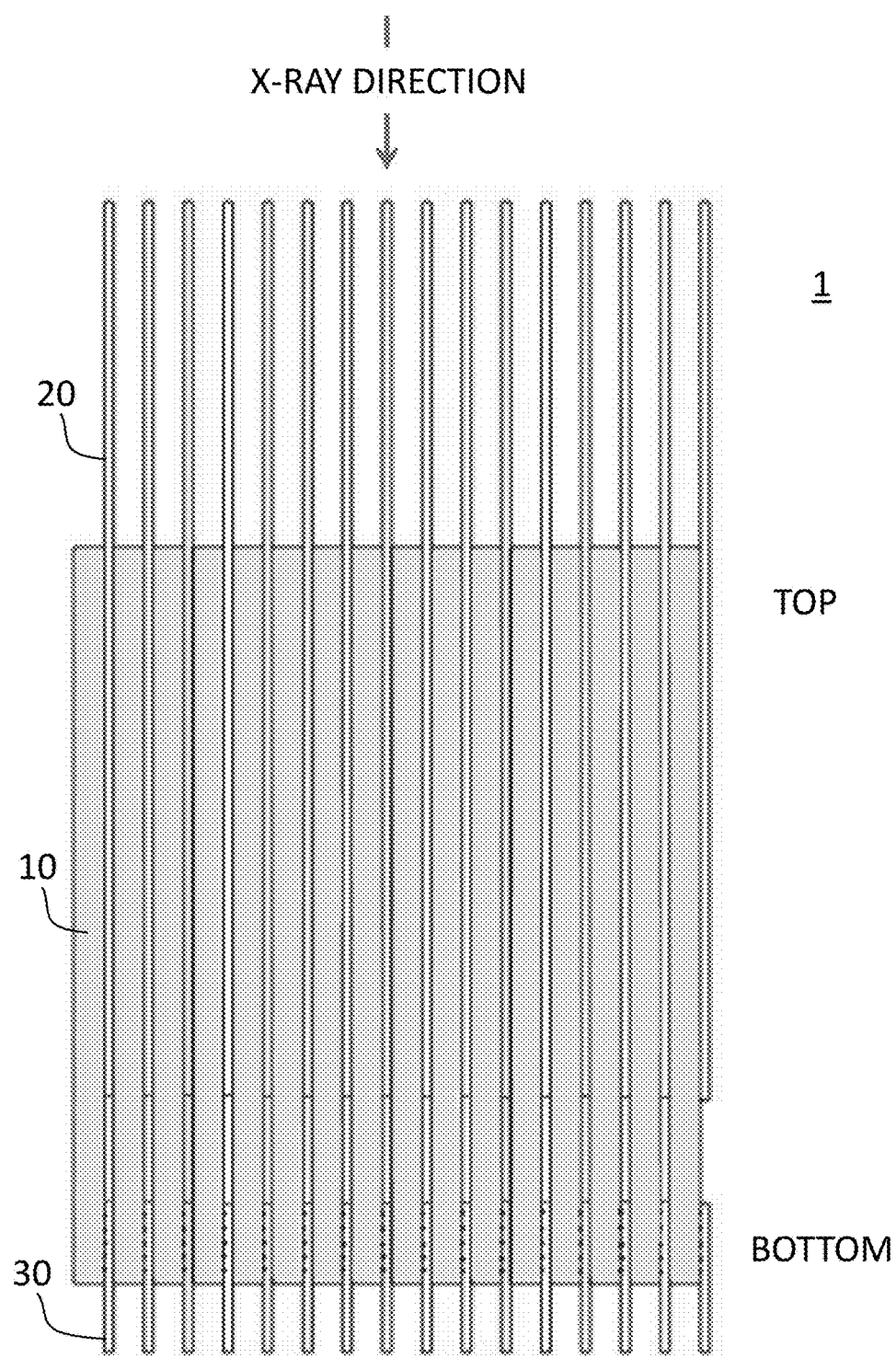
FIG. 2 is a schematic diagram illustrating an example of a detector module for a modular x-ray detector.

FIG. 2 is a schematic diagram illustrating an example of a detector module for a modular x-ray detector. In this example, the detector module 1 comprises multiple x-ray detector substrates 10 and associated anti-scatter collimators 20.

Each x-ray detector substrate 10 has a number of detector diodes, and each x-ray detector substrate 10 has an associated anti-scatter collimator 20. Further, each x-ray detector substrate 10 has an integrated circuit 30 for collecting x-ray signals from the diodes attached to the x-ray detector substrate at the bottom of the x-ray detector substrate 10 assuming the top is where the x-rays enter, and the associated anti-scatter collimator 20 is placed above the integrated circuit 30.

This type of detector module enables an efficient way of building a modular x-ray detector. Embodiments of the modular x-ray detector have several structural advantages, as will be appreciated from the examples described herein.

In a second aspect of the proposed technology, there is thus provided a modular x-ray detector 100 comprising a number of detector modules 1 of the first aspect.

The detector module may be embodied in many different variations.

By way of example, the integrated circuits may be Application Specific Integrated Circuits, ASICs.

For example, the ASIC may be extending over the edge of the x-ray detector substrate so that part of the ASIC is outside of the silicon detector substrate to enable connection of power and data transfer to the ASIC without having to route this on the silicon detector substrate.

The signals may for example be routed from the individual diodes to inputs of the ASIC.

Optionally, power lines and data transfer lines are wire-bonded to power and data transfer pads at the ASIC outside the substrate, or a redistribution layer on the substrate is used to connect to power, data transfer pads and to input signal pads and redistribute the input signals from the x-ray detector substrate to the ASIC.

As a complement, a heat conductor may be attached to the ASIC as a means for cooling.

By way of example, the anti-scatter collimators may be anti-scatter foils or plates.

For example, anti-scatter foils may positioned between the x-ray detector substrates.

The anti-scatter foils may be made of a heavy material such as Tungsten.

In a particular example, the integrated circuits are Application Specific Integrated Circuits, ASICs, and the anti-scatter collimators are Tungsten foils and the ASICs are placed on the x-ray detector substrate under the Tungsten foils to minimize so-called dead area in the detector and the ASICs will be protected from direct radiation.

Preferably, a tapered geometry in which, for each x-ray detector substrate, the x-ray detector substrate and the associated anti-scatter collimator are pointing back to the source may be provided for by means of a spacer placed at the silicon detector substrate or at the anti-scatter collimator.

Normally, a number of x-ray detector substrates are tiled with respect to each other to form a detector module.

As an example, each x-ray detector substrate and corresponding integrated circuit may be formed as a sensor multi-chip module, MCM, assembly, and a multitude of sensor MCM assemblies may then be connected into the detector module.

For example, the detector module may be sub-divided into a number of detector tiles, where each detector tile includes a number of sensor MCM assemblies, for example as illustrated in FIG. 7.

In a particular example, each detector tile includes a circuit for demultiplexing commands from the corresponding detector module to the detector tile to reduce the number of connections between the detector tile and the detector module, for example as illustrated in FIG. 7.

Typically, the commands are control commands directed to the sensor MCM assemblies.

The detector module may comprise a number of data storage circuits and data processing circuits, wherein each detector tile is managed by a data processing circuit.

For example, the detector module may include a control and communication circuit for distributing control commands for the sensor MCM assemblies and controlling the readout of stored scanning data from the data storage circuits.

In a particular example, the x-ray detector substrates are Silicon detector substrates.

For a better understanding, the proposed technology will now be described with reference to non-limiting illustrative examples.

In order to avoid any dead area the integrated circuit (ASICs) collecting the x-ray signals from the diodes has been attached to the x-ray detector diode substrate at the bottom side assuming top side is where the x-rays enter. The anti-scatter collimator is e.g. made up of Tungsten foils in between each Silicon detector substrate. In order to minimize so called dead area in the detector (area which is not functioning as a detector such is the mechanical support, the Tungsten foils, air gaps etc.) the ASICs for collecting the x-ray signals from the diodes are placed under the Tungsten foils. This also means the ASICSs will be protected from direct radiation. In order not to be significantly thicker than the Tungsten foils the ASICs are thinned down to 50-100 um.

In a particular example, the ASIC is flip chipped to the Silicon detector substrate and each diode is connected through a trace to a dedicated ASIC input. Moreover the ASIC is sticking out over the edge of the silicon detector substrate. This gives space for larger components like capacitors that has to be situated close to the ASIC to optimize reliability and noise performance.

This means that thick traces for power, which would make the silicon substrate more expensive to produce, is not required. The power connections can be provided for by other means to the ASIC. For example power lines could be wire-bonded to supply pads at the ASIC.

Another solution would be to use a redistribution layer that would connect to power, data transfer pads and to input signal pads and redistribute the signals from the ASIC to the Silicon detector substrate.

Behind the Silicon detector substrate there will be space for electronic components such as capacitances that should be positioned close to the electronic. It is also possible to put an x-ray absorber in a heavy material such as Tungsten or Molybdenum after the Silicon to avoid that any x-rays transmitted through the silicon is penetrating further into the assembly. It is also possible to put radiation-protected material around the integrated circuit to minimize any radiation damage.

As a means for cooling a heat conductor, preferably with matching heat expansion co-efficient to Silicon, can be attached to the ASIC and the heat produced by the ASIC power can be transferred to a place where it can easily be taken care of by standard air or liquid cooling means.

FIG. 1 is a schematic diagram illustrating an example of an x-ray detector module and a corresponding modular detector assembly. FIG. 1 shows an example of a module and how such modules could build up a corresponding modular detector assembly having a full detector area of desired size. Note that the modules are pointing back to the x-ray source.

FIG. 2 is a schematic diagram illustrating an example of a detector module for a modular x-ray detector. FIG. 2 thus displays an example of a module design. Starting from the top, the anti-scatter foils made of a heavy material like W is displayed, the foils are typically significantly thinner than the silicon detector substrate which is the active detector volume consisting of diodes. The x-ray detector substrate is positioned in-between the foils. The x-ray detector substrate may for example be in the order of 0.5 mm thick. Both foils and x-ray detector substrate is pointing back to the x-ray source to avoid parallax errors and shadowing from the anti-scatter foils. At the bottom the ASICs are indicated, they are typically as thin as the W foils and positioned behind those foils (looking from above)

Figure 3:
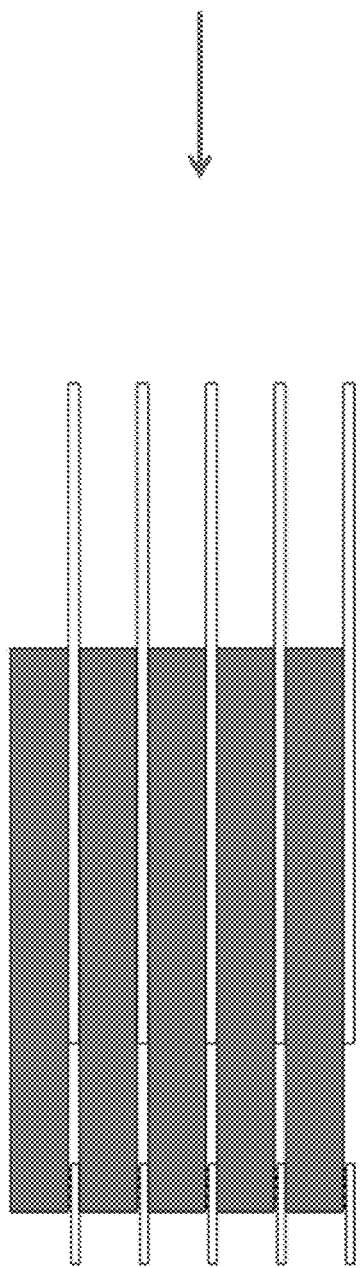
FIG. 3 is a schematic diagram illustrating a close-up of the example module shown in FIG. 2.

FIG. 3 is a close-up of FIG. 2 showing the anti-scatter foils, the silicon detector substrate and the ASICs.

FIG. 4 shows an example of how to get a tapered geometry when Tungsten and Silicon detector substrate are pointing back to the source by placing a spacer as for example a stud bond at the silicon detector substrate or at the anti-scatter grid.

Figure 5:
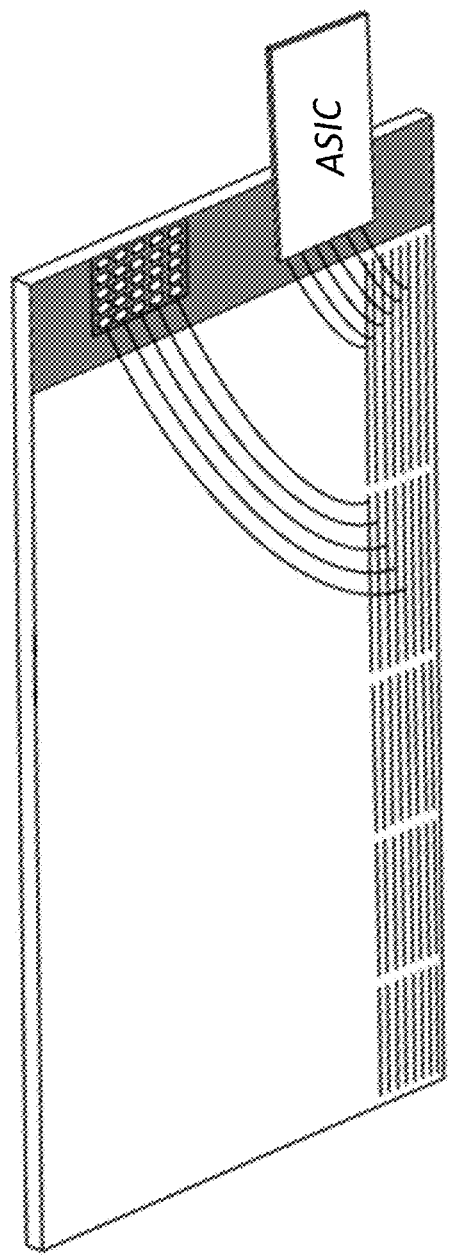
FIG. 5 is a schematic diagram illustrating an example of how the ASIC can be flip chipped to the silicon detector substrate where input signals are routed from the individual diodes to the ASIC inputs.

In order for all Tungsten foils and Silicon detectors to precisely point back to the source a spacer between each element may be used. Due to this spacer the whole detector will be curved. FIG. 4 shows an example of how to achieve a tapered geometry by placing a spacer of for example a stud bump at the silicon detector substrate or at the Tungsten foil FIG. 5 displays an example of how the ASIC can be flip chipped to the silicon detector substrate where input signals are routed from the individual diodes to the ASIC inputs. Part of the ASIC is outside of the silicon detector substrate to enable connection of power and data transfer to the ASIC without having to route this on the silicon detector substrate.

Figure 6:
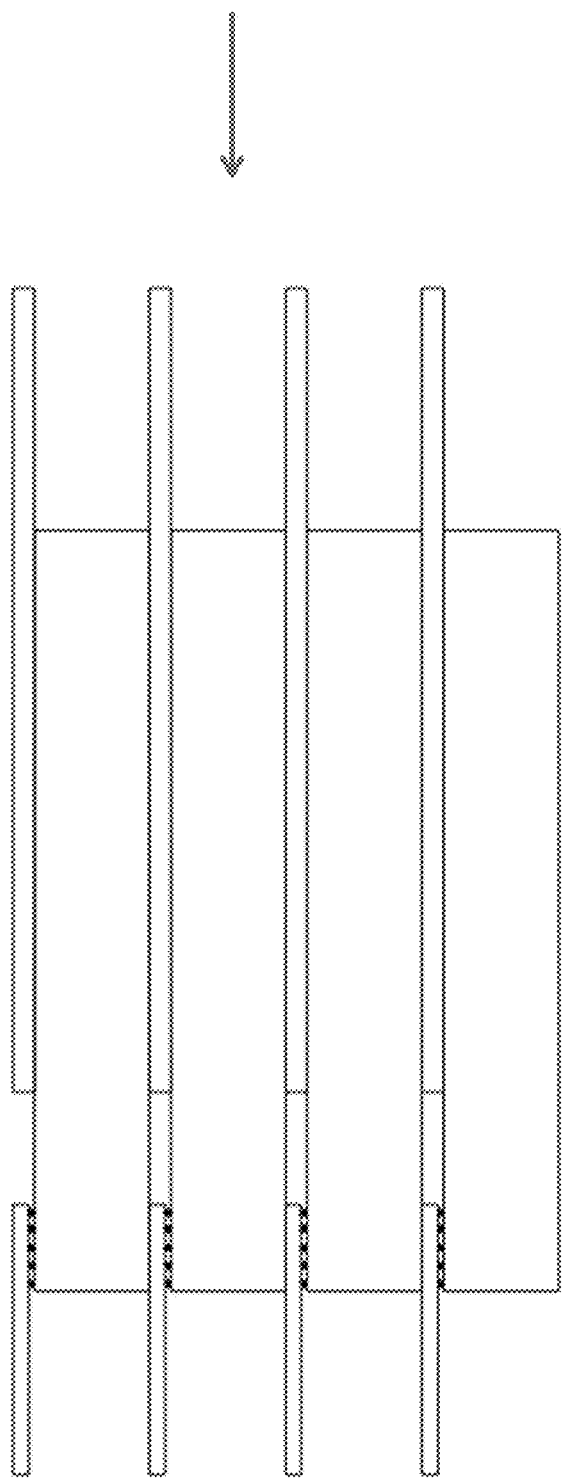
FIG. 6 is a schematic diagram illustrating an example of a view from the side showing that there is space for wire-bonds, passive components and cabling below the detector substrate.

FIG. 6 is a view from the side showing that there is space for wire-bonds, passive components and cabling behind the silicon detector substrate. Heat conductor is not indicated in the image but can be attached to ASIC.

FIG. 7 is a schematic diagram illustrating an example of the architecture for electronic readout of data.

A significant challenge is to read out the data for a multitude of x-ray detector modules.

An example of a possible architecture solution is shown in FIG. 7. In this example a multitude of sensor MCM (Multi-Chip Module) assemblies are connected into one detector module. In this context, a sensor MCM assembly means silicon substrate detector and ASIC assembly.

For example, each detector module may be managed by a small FPGA (Field Programmable Gate Array) or similar circuit that handles clock distribution, loading of configuration data and distribution of commands to the sensor MCMs.

By way of example, a full detector can contain several 10:th of thousands ASICs thus connecting and setting up/programming all ASICs in a detector is a particular challenge.

Each detector module may be based on the sensor MCMs in steps, for example by arranging sensor MCMs on detector tiles and then building a detector module based on a number of detector tiles. In other words, each detector module may include a number of detector tiles, where each detector tile includes a number of sensor MCM assemblies.

In order to physically fit all connections and meet bandwidth demands a scheme illustrated in FIG. 7 can be used.

Each tile includes a small FPGA for demultiplexing of low information content signals such as clock and/or commands from the module to the tile. As indicated in FIG. 7 this can for example reduce the number of connections between tile and module from 42+21 to 3+21.

Local memories (3*DDR in FIG. 7) distributed in the modules stores/buffers data to relax bandwidth demands on downstream connections. All these memories are read out at a lower rate when acquisition is finished. This arrangement can reduce the number of connections from the module to the motherboard, in the example in FIG. 7 the reduction is from 72 (3*24) to 8 connections.

Local memories and processors/FPGAs are preferably used to handle setup of the circuits, in order to parallelize the task. A single source configuring 10:ths of thousands of ASICs is too slow. A preferred way might be to broadcast common information parts and send specific information separately. Calibration may be handled locally on the module level, including calculation, storage, loading and so forth.

By way of example, the detector mother board has the control of the complete system, and can be regarded as an overall control system and link to external systems.

In a particular example, three detector tiles are put together into a detector module. Each detector tile is managed by a processing circuit with associated memory/data storage, e.g. a data storage FPGA or similar circuit. This FPGA/circuit stores all scanning data from one sensor MCM assembly locally and sends control commands intended for the sensor MCM assembly. A control and communication FPGA or similar circuit may also be placed in the detector module. At power up, this unit manages configuration of other FPGAs/circuits in the detector module, using configuration data stored in a local FLASH. When the system is up and running, it distributes the control commands for the sensor MCM assemblies and controls the readout of stored scanning data from the three processing circuits with associated memory/data storage, e.g. data storage FPGAs. The data is sent to the detector mother board.

By way of example, commands may be broadcast to all detector modules for synchronous execution, or individually addressed for other tasks. It controls the readout of the scanning data from the detector modules, downloading of calibration data to the sensor MCM, etc.

From the detector mother board the data can be further transmitted to one or more external computers for post-processing and/or image reconstruction.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. By way of example, it will be appreciated that the arrangements described herein can be implemented, combined and re-arranged in a variety of ways. In particular, different part solutions in the different embodiments can be combined in other configurations, where technically possible.

REFERENCES

[1] U.S. Pat. No. 7,582,879
[2] U.S. Pat. No. 7,560,702
[3] M. Danielsson, H. Bornefalk, B. Cederstrom, V. Chmill, B. Hasegawa, M. Lundqvist, D. Nygren and T. Tabár, "Dose-efficient system for digital mammography", Proc. SPIE, Physics of Medical Imaging, vol. 3977, pp. 239-249 San Diego, 2000

[4] C. Xu, M. Danielsson and H. Bornefalk, "Evaluation of Energy Loss and Charge Sharing in Cadmium Telluride Detectors for Photon-Counting Computed Tomography", *IEEE Transactions on Nuclear Science*, vol. 58, no. 3, pp. 614-625, June 2011

[5] U.S. Pat. No. 8,183,535

The invention claimed is:

1. A detector module for a modular x-ray detector comprising:
a plurality of x-ray detector substrates and associated anti-scatter collimators,
wherein each x-ray detector substrate has a plurality of detector diodes, and each x-ray detector substrate has an associated anti-scatter collimator,
the x-ray detector substrates are tiled with respect to each other to form the detector module,
the anti-scatter collimators are anti-scatter foils or plates that are interleaved between the x-ray detector substrates,
the anti-scatter foils or plates are thinner than the x-ray detector substrates,
the diodes of the x-ray detector substrates define an active detector volume,
the x-ray detector substrates and the anti-scatter foils or plates having a length direction, the anti-scatter foils or plates and the x-ray detector substrates being aligned to point an x-ray source in the length direction,
each x-ray detector substrate has an integrated circuit configured to collect x-ray signals from the diodes, the integrated circuit being attached to the x-ray detector substrate at the bottom of the x-ray detector substrate in the length direction of the x-ray detector substrate, the top of the x-ray detector substrate being where the x-rays enter, and
the associated anti-scatter collimator is disposed above the integrated circuit to protect the integrated circuit from radiation.

2. The detector module of claim 1, wherein the integrated circuits are Application Specific Integrated Circuits (ASICs).

3. The detector module of claim 2, wherein the ASIC is extending over the edge of the x-ray detector substrate so that part of the ASIC is outside of the silicon detector substrate to enable connection of power and data transfer to the ASIC without having to route the connection of the power and data transfer to the ASIC on the silicon detector substrate.

4. The detector module of claim 2, wherein signals are routed from the individual diodes to inputs of the ASIC.

5. The detector module of claim 2, wherein power lines and data transfer lines are wire-bonded to power and data transfer pads at the ASIC outside the substrate, or a redistribution layer on the substrate is used to connect to power, data transfer pads and to input signal pads and redistribute the input signals from the x-ray detector substrate to the ASIC.

6. The detector module of claim 2, wherein a heat conductor is attached to the ASIC to provide cooling.

7. The detector module of claim 1, wherein the anti-scatter foils are made of a heavy material.

8. The detector module of claim 7, wherein the heavy material is Tungsten.

9. The detector module of claim 1, wherein the integrated circuits are Application Specific Integrated Circuits (ASICs), the anti-scatter collimators are Tungsten foils, and the ASICs are placed on the x-ray detector substrate under the Tungsten foils to minimize dead area in the detector and so the ASICs are protected from direct radiation.

10. The detector module of claim 1, wherein a tapered geometry in which, for each x-ray detector substrate, the x-ray detector substrate and the associated anti-scatter collimator are pointing back to the source is provided by a spacer placed at the silicon detector substrate or at the anti-scatter collimator.

11. The detector module of claim 1, wherein each x-ray detector substrate and corresponding integrated circuit is formed as a sensor multi-chip module (MCM) assembly, and a plurality of sensor MCM assemblies are connected into the detector module.

12. The detector module of claim 11, wherein the detector module is sub-divided into a plurality of detector tiles, where each detector tile includes a plurality of sensor MCM assemblies.

13. The detector module of claim 12, wherein each detector tile includes a circuit configured to demultiplex commands from the corresponding detector module to the detector tile to reduce the number of connections between the detector tile and the detector module.

14. The detector module of claim 13, wherein the commands are control commands directed to the sensor MCM assemblies.

15. The detector module of claim 12, wherein the detector module comprises a plurality of data storage circuits and data processing circuits, wherein each detector tile is managed by a data processing circuit.

16. The detector module of claim 15, wherein the detector module includes a control and communication circuit configured to distribute control commands for the sensor MCM assemblies and control readout of stored scanning data from the data storage circuits.

17. The detector module of claim 1, wherein the x-ray detector substrates are Silicon detector substrates.

18. A modular x-ray detector comprising:
a plurality of the detector modules of claim 1.

* * * * *